United States Patent
Gowda et al.

(10) Patent No.: US 8,156,418 B2
(45) Date of Patent: Apr. 10, 2012

(54) IMAGE ACQUISITION FROM DYNAMIC CONTENT FOR DELIVERY TO NETWORK-ENABLED STATIC DISPLAY DEVICES

(75) Inventors: Sunil Gowda, Kirkland, WA (US); Tracy Ard, Sammamish, WA (US); Rafael Sagula, Kirkland, WA (US); Arnold Blinn, Hunts Point, WA (US); Todd Buiten, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 12/133,859

(22) Filed: Jun. 5, 2008

(65) Prior Publication Data

US 2009/0307571 A1    Dec. 10, 2009

(51) Int. Cl.
*G06F 17/00* (2006.01)
*G06F 15/16* (2006.01)

(52) U.S. Cl. ........ 715/202; 715/205; 715/234; 715/255; 709/217; 709/221

(58) Field of Classification Search .......... 715/200–207, 715/234, 251, 254–256, 265, 267, 273, 700, 715/730, 731, 732, 760, 210, 213, 738, 762, 715/851, 854; 709/201, 202, 203, 217, 218, 709/219, 220, 221, 223, 225, 226, 227, 228, 709/229
See application file for complete search history.

(56) References Cited

U.S. PATENT DOCUMENTS

| | | | |
|---|---|---|---|
| 6,226,642 B1 | 5/2001 | Beranek et al. | |
| 6,243,104 B1 | 6/2001 | Murray | |
| 6,307,641 B1 | 10/2001 | Hamano et al. | |
| 6,377,991 B1 * | 4/2002 | Smith et al. | 709/226 |
| 6,397,246 B1 * | 5/2002 | Wolfe | 709/217 |
| 6,886,013 B1 * | 4/2005 | Beranek | 715/234 |
| 7,076,495 B2 | 7/2006 | Dutta et al. | |
| 7,096,418 B1 * | 8/2006 | Singhal et al. | 715/205 |
| 7,111,254 B1 | 9/2006 | Rosen et al. | |
| 7,120,897 B2 * | 10/2006 | Ebbo et al. | 717/108 |
| 7,143,347 B2 | 11/2006 | Su | |
| 7,242,406 B2 | 7/2007 | Robotham et al. | |
| 7,251,780 B2 * | 7/2007 | Cheng | 715/234 |
| 7,412,478 B1 | 8/2008 | Caruso et al. | |

(Continued)

OTHER PUBLICATIONS

"Great Reasons to Web Enable a Device", Retrieved at <<http://www.blunkmicro.com/webreasons.htm>>, Retrieved Date: Feb. 26, 2008, pp. 2.

(Continued)

*Primary Examiner* — Maikhanh Nguyen
(74) *Attorney, Agent, or Firm* — The Law Office of Michael E. Kondoudis

(57) ABSTRACT

An image service uses a uniform resource locator (URL) or other location identifier to retrieve static images embedded in dynamic content presentations from the Internet. The image service uses a set of imaging parameters to extract one or more static images embedded in the dynamic content presentation that can be consumed by the static display device. URLs to existing web pages are entered into a configuration interface on the image service. The image service parses the web pages, identifies a direct location identifier for the embedded image, and passes the direct location identifier to the static display device for direct retrieval of the embedded image. In another implementation, the image service dynamically pulls the selected embedded images from the identified web sites, and downloads the static image files for display on the static display device.

7 Claims, 6 Drawing Sheets

U.S. PATENT DOCUMENTS

| | | |
|---|---|---|
| 7,801,942 B2 | 9/2010 | Caruso et al. |
| 7,809,609 B2 | 10/2010 | Hikida |
| 7,853,593 B2 | 12/2010 | Serdy, Jr. et al. |
| 2002/0062396 A1 | 5/2002 | Kakei et al. |
| 2002/0161794 A1 | 10/2002 | Dutta et al. |
| 2003/0009542 A1 | 1/2003 | Kasal et al. |
| 2003/0025728 A1* | 2/2003 | Ebbo et al. .............. 345/744 |
| 2004/0205650 A1* | 10/2004 | Cheng ...................... 715/530 |
| 2005/0038874 A1 | 2/2005 | Ramaswamy et al. |
| 2005/0198353 A1* | 9/2005 | Zmrzli ....................... 709/232 |
| 2005/0203882 A1 | 9/2005 | Godley |
| 2005/0223084 A1* | 10/2005 | Cheng ...................... 709/219 |
| 2005/0256923 A1 | 11/2005 | Adachi |
| 2006/0085731 A1 | 4/2006 | Cui et al. |
| 2006/0248192 A1 | 11/2006 | Morris et al. |
| 2006/0265652 A1 | 11/2006 | Seitz et al. |
| 2007/0024909 A1 | 2/2007 | Hanechak |
| 2007/0240076 A1 | 10/2007 | Astala et al. |
| 2007/0277114 A1 | 11/2007 | Mudge et al. |
| 2008/0189648 A1 | 8/2008 | Anglin et al. |
| 2008/0222273 A1 | 9/2008 | Lakshmanan et al. |
| 2008/0235594 A1 | 9/2008 | Bhumkar et al. |
| 2008/0275886 A1 | 11/2008 | Caruso et al. |
| 2009/0006271 A1 | 1/2009 | Crowder |
| 2009/0119602 A1 | 5/2009 | Nishiyama |
| 2009/0132551 A1 | 5/2009 | Allen et al. |
| 2009/0177761 A1 | 7/2009 | Meyer et al. |
| 2009/0249194 A1 | 10/2009 | Day |

OTHER PUBLICATIONS

"Wireless Portals and Wireless Service Providers", Retrieved at <<http://www.insight-corp.com/reports/portals.asp>>, Retrieved Date: Feb. 26, 2008, pp. 5.

* cited by examiner

IMAGE ACQUISITION FROM DYNAMIC CONTENT FOR DELIVERY TO NETWORK-ENABLED STATIC DISPLAY DEVICES

CROSS REFERENCE TO RELATED APPLICATIONS

This application is related to U.S. nonprovisional application Ser. No. 12/133,807 entitled "Dynamic content delivery to network-enabled static display devices" filed contemporaneously herewith, the disclosure of which is hereby incorporated herein by reference in its entirety.

BACKGROUND

Digital picture frames have been introduced in recent years that allow users to present digital images on a liquid crystal display within a frame that emulates a traditional picture frame. Such digital picture frames are generally considered as part of a class of "dumb" devices. Such dumb devices may have minimal processing power, limited memory, limited configurability, and limited or no ability to execute non-device-specific software. Other types of dumb devices are, for example, digital cameras, MP3 players, DVD players, and kitchen appliances (e.g., a refrigerator with a display). In the case of a digital picture frame, the display device may be able to copy one or more static digital image files into a memory and present the images on the display. If multiple image files are stored in memory, the device may rotate through the images, periodically changing the image displayed. The duration of display of a particular image may be preprogrammed and immutable or may be configurable by a user.

Some dumb devices merely accept memory cards that may be manually loaded with new digital images from a computer, digital camera, or other device capable of transferring files onto a memory card. Other dumb devices have network connectivity capabilities. For example, a digital picture frame may be connected to a local computer or directly to a network to download additional image files or to replace the image files in the memory with new image files. For example, a digital picture frame could be given to grandparents who plug it into a power source and a telephone outlet. Their children can then upload digital image files of the grandchildren to a service that contacts the dumb device and downloads the image files to the memory of the dumb device. Such dumb devices do not have the ability to seek out, display, and update other types of dynamic content, for example, content accessible on the Internet/World Wide Web (the Web).

SUMMARY

The technology disclosed herein allows a user to capture images embedded in a dynamic content presentation from any existing web page and display it on a static display device. In one implementation, an image service takes a valid uniform resource locator (URL) or other content location identifier and retrieves the content from the Web. Instead of returning all of the hypertext mark-up language (HTML) content for display on the static display device, the image service uses a set of imaging parameters to extract one or more static images embedded in the dynamic content presentation that can be consumed by the static display device. For example, a user could simply enter URLs to existing web pages into a configuration interface on the image service. The image service then dynamically pulls the selected embedded images from the identified web sites, and downloads the static image files for display on the static display device. Retrieval of such images may be done according to specific criteria or configuration settings. For example, retrieval may be limited to include only images bigger than a particular size, only include the three largest images, or only retrieve an image with a specific HTML tag. In another implementation, the image service may provide URLs in an RSS feed to the static display device identifying a specific location of an embedded image in a dynamic content presentation thereby allowing the static display device to directly retrieve the embedded images from the identified web page.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

Figure 1:
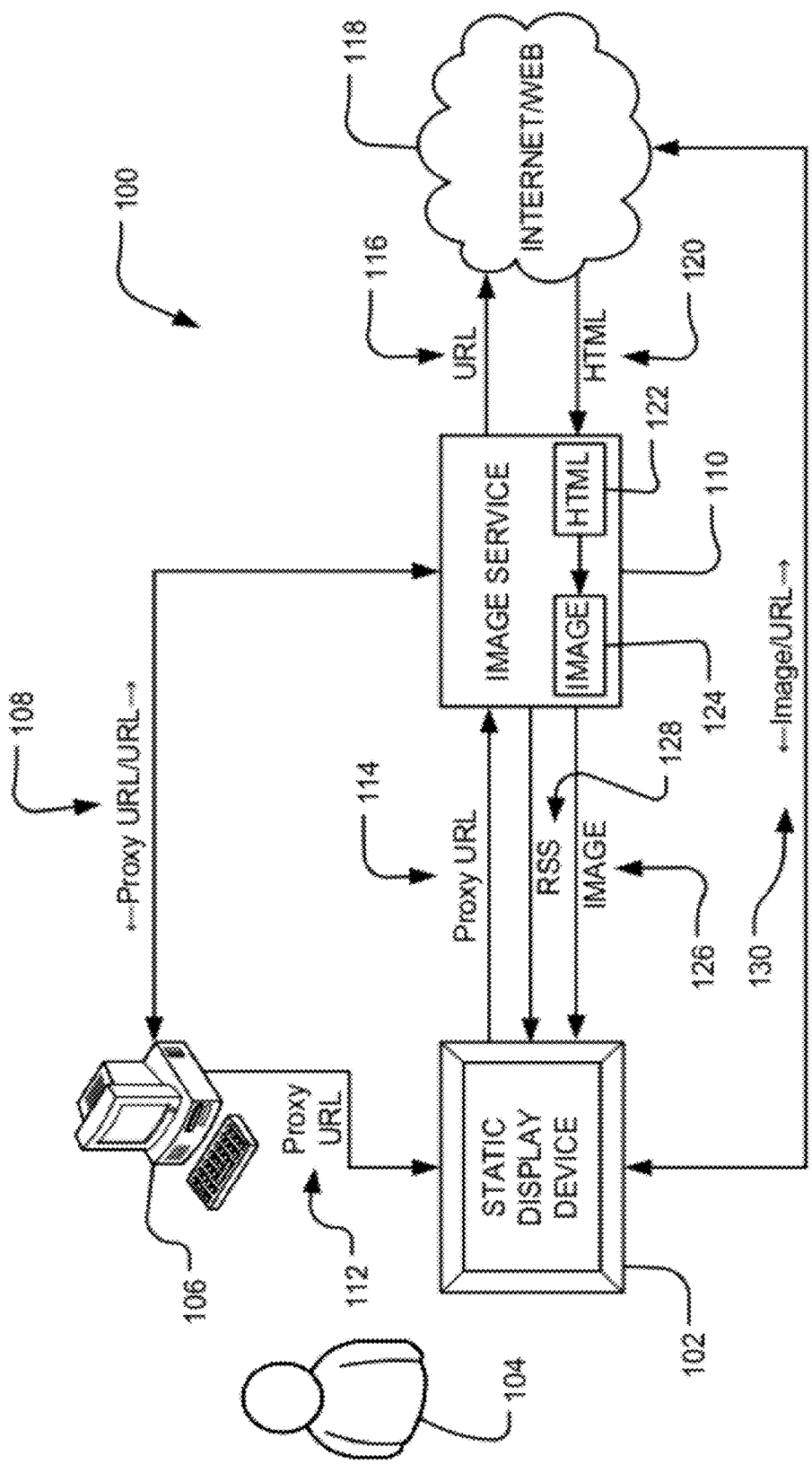
FIG. 1 is a schematic diagram of one implementation of a dynamic content delivery system for a static display device.

A user of a static display device, e.g., a digital picture frame or other dumb device with a display, can use the technology disclosed herein to capture web pages (or other dynamic content presentations) and display them on the static display device. Most digital picture frame and similar dumb display devices are only capable of presenting a bitmap image file per design; they are not equipped to operate a browser program to display web pages coded in HTML. The purpose of the technology disclosed herein is to allow a user to identify a dynamic content presentation (e.g., a web page) that the user would like to display on the static image device and then transform the dynamic content into a form that can be displayed by the static image device. Types of static display devices may include, for example, digital cameras, MP3 players, DVD players, telephones, televisions, kitchen appliances (e.g., a refrigerator with a display), and even a screen saver program operating on a computer.

The user could be the owner of the static image device or could merely be an administrator for the device. For example, a son could provide his mother with a digital picture frame for her house, but the son could act as an administrator for the digital picture frame to regularly upload new pictures of the grandchildren to a frame service that are then downloaded to the digital picture frame. With this technology, the user can further configure an account with a separate image service to retrieve and convert dynamic content for display on the digital picture frame that was never designed or intended for such display. This technology may also work with static images devices that are not connected to the Internet or a telephone network. For example, a static image device that only takes a memory card can take advantage of the image service and this functionality if the user copies images generated by the image service onto the memory card and plugs it into the static image device.

The image service takes a valid URL or other content location identifier provided by the user and retrieves the content from the Web. Instead of returning raw HTML content to the static display device, the image service uses a set of imaging parameters to render the HTML files into a static image, sized appropriately, that can be downloaded to the static display device. A static display device with network connectivity can be configured to request new images from the image service. This can be achieved by contacting the image service with a proxy location identifier, for example, a URL that points to the account at the image service associated with the particular static display device. This "proxy URL" could further identify unique dynamic content desired by the static display device. The image service may associate the actual URL of the desired dynamic content and, upon receipt of the request at the proxy URL, may retrieve and transform the dynamic content presentation from the actual URL into a static image file that can be presented on the static display device.

In some implementations, one or more proxy URLs may be provided to the static display device in an RSS feed. This RSS feed may describe a list of static images available from the image service for download and rendering on the static display device. These individual images may comprise a wide variety of images including images from photo share sites, dynamic content transformed by the image service, and images directly generated by the image service. Images generated by the image service may be high fidelity images constructed using raw information content, e.g., weather or news, rendered by the image service specifically for the static display device rather than an image representation of a web page. The proxy URLs for each of these images may reside on the image service device.

When a static display device requests one of these static images, the image service would return the requested image. For a photograph, the image service may collect the image from another service, e.g., a photo share web site, and no further processing may need to be performed. For an image representing current information, e.g., weather or news, the image service may create a high quality static image in a template by inserting information from real-time data feeds. For a dynamic content request, e.g., a web page, the image service would return a static image representation of the page itself rendered from the HTML and cached on the image service. Note that the rendering of static images by the image service may be performed on demand or it may be performed as a background task for performance reasons. The static images may also be cached and refreshed periodically. For images embedded on a web page, the image service may retrieve the target HTML page, apply a set of rules or parameters (e.g., size, number of images), and create pointers to the actual images on other servers where the images reside.

The terms dynamic content or dynamic content presentation as used herein refer to presentations of content not meant for static display and which are generally accessible via a network. For example, a web page coded in HTML that is regularly updated with information and images would be considered a dynamic content presentation. Exemplary web pages meeting this definition may be pages regularly updated with news, stock market, or weather feeds; pages tied to an advertising service that regularly updates advertisement locations on the page; or pages that present new content regularly, e.g., a page with a new embedded each day (or just the image), ski or surf conditions, or other information generally not available in a Really Simple Syndication (RSS) feed.

An exemplary implementation of a dynamic content delivery system 100 for a static display device 102 is depicted in FIG. 1. In this example, the static display device 102 is presented in the form of a digital picture frame that may be used by a user 104 to display static images, for example, still digital photographs, but it may be any type of static display device. For operability of this technology, the static display device 102 may be network enabled. The static display device 102 is thus connected to a communication network in order to receive updated images for display. Connection with communication network can be made in a variety of ways, for example, through a direct twisted-pair connection to a telephone jack to provide a gateway to the public switched telephone network; through an Ethernet connection to a local area network; or through a wireless transceiver connecting the static display device 102 to a local area network. In any of these cases, either direct connection with a telephone network or connection with a local area network, these initial networks may be further connected with a wide area network, for example, the Internet/Web, in order to implement the dynamic content delivery system 100.

The user 104 may employ a computer 106, e.g., a personal computer (PC), a notebook computer, or a handheld device, in order to communicate with an image service 110 to configure images for display on the static display device 102. In normal operation, the user 104 may use an application on the computer 106 to communicate with the static display device 102 over a local network to upload digital images, e.g., photographs, to the static display device 102 and configure settings on the static display device 102. Alternatively, using the disclose technology, a user could run an application on the computer 106 that communicates directly with the image service 110 to access the static image files and then copy the static images to a memory card for insertion in the static display device 102.

In order to deliver dynamic content to the static display device 102, the image service 110 translates dynamic content presentations into static content that is consumable by the static display device 102. The user 104 may use the user's computer 106 to further configure the image service 110 to provide dynamic content to the frame service 10. Again the user's computer 106 may interface with the image service 110 over the Internet using a browser application. The image service 110 may be a web-enabled application operated on a network server computer connected with the Internet.

The image service 110 allows the user 104 to select dynamic content presentations, for example, content from the Web, for transformation into static images that can be displayed on the static display device 102. The user can identify desired dynamic content by creating a list or inventory of URLs for the image service 110 to access and convert. The user 104 can also direct the image service 110 to refresh the acquisition and transformation of the dynamic content on a regular basis. For example, the user 104 may direct the image service 110 to refresh its capture of a web page containing stock quote information every 10 minutes, while capturing a web page with ski conditions on a daily basis. In practice, the user 104 may directly input URLs into a listing with the image service 110 as indicated by proxy URL/URL path 108. Alternatively, the user 104 may search or browse for desired web sites and web content on the Internet/Web through an interface within the image service 110 and then select a desired web page found within the context of the image service 110.

Once the user 104 has configured the desired dynamic content for delivery by the image service 110, the image service 110 may create a proxy URL that will direct a browser or file transfer application to an image file created within the image service 110 specific the user 104. The proxy URL may be a storage location at the image service 110 or separate storage device managed and accessible by the image service 110 where the dynamic content, statically rendered, is stored. Alternatively, the proxy URL may be a pointer to a specific instruction set on the image server 110 that instructs the image server 110 to retrieve specific dynamic content from a particular location and transform the dynamic content into a static image according to a set of configuration parameters as further described below. Thus, the dynamic content may be retrieved asynchronously according to a routine wherein the static image is rendered and stored until requested, synchronously when the static display device 102 requests the dynamic content, or a combination of both (e.g., if an asynchronous retrieval has not yet been performed, the dynamic content may be retrieved immediately). If a static image file is not in storage when requested, the image server 110 may return an interim message image to the display device 102 indicating that the dynamic content is being retrieved.

In one implementation, the image service 110 may return the proxy URL to the user's computer 106 of the user 104 as indicated in proxy URL/URL path 112. The user 104 may then provide the proxy URL to the static display device 102 as indicated by proxy URL path 112. The static display device 102 then uses the proxy URL to request a static image 124 from the image service 110 as indicated by proxy URL path 114.

In an alternate implementation, the image service 110 may provide the static display device 102 with a RSS feed as indicated by RSS path 128. The RSS file provided to the static display device 102 may be in the form of an XML file listing the proxy URL paths. The RSS file may further provide a schedule instructing the static display device 102 when to update an image from a particular proxy URL with new dynamic content. The static display device 102 may then request updated dynamic content by communicating with the image service 110 at the proxy URL address.

In addition to supporting the transformation of dynamic content presentations (e.g., web pages) into static images, a user may configure the image service 110 to provide access to content from a photo sharing site. The image service 110 may then include URLs for content from these photo sharing sites in the RSS feed exposed to the static display device 102. In this case, the URL for a static image need not be a proxy URL. The image service 110 may provide a direct URL reference for the image at the photo sharing site to the static display device 102 as indicated in image/URL path 130. A user can also identify a dynamic content presentation with embedded static images and configure the image service 110 to provide access to such images. In this case, the image service 110 may retrieve the web page, parse it, identify the static images, apply selection criteria, and include direct URLs to the embedded images in the output to the static display device 102. The embedded images can then be retrieved directly by the static display device 102 as indicated in image/URL path 130.

In response to a request received from the static display device 102 or in accordance with a schedule determined by the user 104, the image service 110 will retrieve dynamic content from websites on the Internet 122 identified by one or more of the URLs listed by the user 104 in the user's account as indicated by URL path 116. The image service 110 retrieves dynamic content from the Internet 118, generally in HTML format as indicated by HTML path 120, but other formats may be accepted as well. Once received at the image service 110, the HTML content 122 is transformed into the static image file 124. The static image file 124 may be in the form of a bitmap file, e.g., a Joint Photographic Experts Group (JPEG) file, a graphic interchange format (GIF) file, a tagged image file format (TIFF) file, or any of a number of static image file formats that may be used by the static display device 102. While this description discusses accessing the HTML dynamic content and generating the static image 124 synchronously or "on demand," these functions may also be performed when the user initially configures the service so that this processing is complete at the time the image is requested. Dynamic content may further be similarly asynchronously retrieved periodically and cached by the image service 110.

The static display device 102 requests the static image 124 from the image service 110 at the proxy URL location as indicated by the proxy URL path 114. The static display device 102 receives the image 124 from the image service 110 over the network as indicated by the image path 126. Depending on the configuration of the static display device 102, the static image 124 of the dynamic content may be stored in memory on the static display device 102 to automatically replace the image previously presented on the static display device 102 or for display in rotation with other static images on the static display device 102 according to a schedule.

Figure 2:
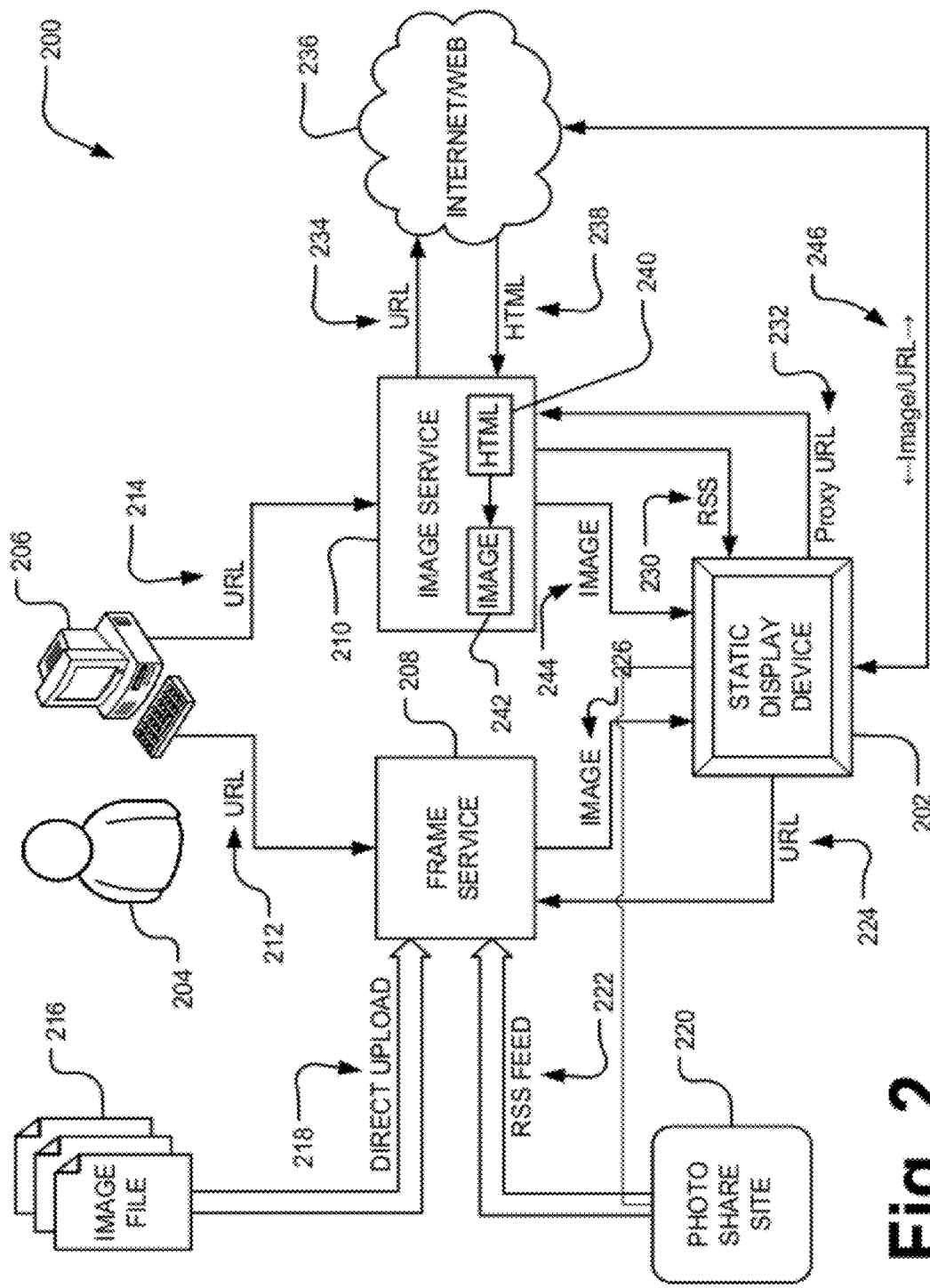
FIG. 2 is a schematic diagram of another implementation of a dynamic content delivery system for a static display device.

An alternate embodiment of a dynamic content delivery system 200 for a static display device 202 is depicted in FIG. 2. Again in FIG. 2, an exemplary static display device 202 is depicted as a dumb device in the form of a digital picture frame. In contrast to FIG. 1, the system 200 of FIG. 2 can be considered an "open" system as the static display device 202 is able to communicate directly with services other than a manufacturer's specific frame service 208. As in the prior implementation, a user 204 may use a computer 206 connect with the frame service 208 to configure the static display device 202.

In standard operation, the frame service 208 may receive one or more image files 216 that are directly uploaded 218 by the user 204 to the frame service 208. As previously noted, the frame service 208 may be a web service accessible over the Internet. However, the frame service 208 may alternately be an application running on the user's computer 206 that allows the user's computer 206 to upload the image files 216 directly to the static display device 202 over a local area network, or alternatively via a direct connection between the users computer 206 and the static display device 202, e.g., via a universal serial bus connection. In an embodiment in which the frame service 208 is a web-based application, the frame service 208 may also receive images from an Internet source such as a photo share site 220. The frame service 208 may be configured to receive an RSS feed 222 from the photo share site 220 indicating the file names to download or URLs to access from the photo share site 220 on a scheduled basis. The frame service 208 can then send the images to the static display device 202 received from the photo share site 220.

In an alternate embodiment similar to FIG. 1, the image service 210 in FIG. 2 may be designed to additionally provide this functionality. In addition to supporting the transformation of dynamic content presentations (e.g., web pages) into static images, a user can configure the image service 210 to access content from a photo sharing site. The image service

210 may then include URLs for content from these photo sharing sites in the RSS feed exposed to the static display device 202. In this case, the URL for a static image need not be a proxy URL. The image service 210 may provide a direct URL reference for the image at the photo sharing site to the static display device 202 as indicated in image/URL path 246. A user can also identify a dynamic content presentation with embedded static images and configure the image service 210 to provide access to such images. In this case, the image service 210 may retrieve the web page, parse it, identify the static images, apply selection criteria, and include direct URLs to the embedded images in the output to the static display device 202. The embedded images can then be retrieved directly by the static display device 202 as indicated in image/URL path 246. This still may be done asynchronously or synchronously, but the proxy URL is not needed for this function.

It may be appreciated that the frame service 208 could simultaneously be a web-based application service as well as a local application running on a user's computer 206. In one implementation, the frame service 208 may act as a repository for digital images that may be provided to or accessed by the static display device 202. In one typical implementation, the static display device 202 may be configured to access a URL that points to the frame service 208 or a specific file directory thereof on a scheduled basis as indicated by URL path 224. When the frame service 208 receives the URL request from the static display device 202, the frame service 208 sends the image located at the specific URL in the frame service 208 to the static display device 202 for presentation as indicated by image path 226.

As previously noted, in the system 200 depicted in FIG. 2 the static display device 202 is configurable to communicate directly with services other than the frame service 208 and thus may be considered an open system. In this implementation, the user 204 may use the computer 206 to configure the image service 210 to provide dynamic content directly to the static display device 202. As previously discussed with respect to FIG. 1, the user 204 may use the computer 206 to input URLs as indicated by URL path 214 into a list, database, or schedule maintained at the image service 210. Alternatively, through an interface provided on the user's computer 206 by the image service 210, the user can browse the Internet/Web 236 and select desired pages containing dynamic content for regular access and delivery to the static display device 202. These Internet locations may be translated by the image service 210 into proxy URLs that may be used by the static display device 202 to identify particular dynamic content for access and retrieval by the image service 210. The proxy URLs may be provided to the user's computer 206 for provision to the static display device 202 through the frame service 208 or otherwise as described below.

The image service 210 accesses dynamic content presentations on the Internet 236 using the URLs configured by the user 204. In one embodiment, the static display device 202 initiates a request to the image service 210 to retrieve the dynamic content presentation. The request from the static display device 202 may be in the form of a proxy URL. The image service 210 accesses the dynamic content presentation as identified by the URL path 234 in FIG. 2. When HTML files 240 are retrieved by the image service 210 from the Internet 236 as indicated by HTML path 238, the HTML files 240 may be processed by the image service 210 to convert the HTML files 240 into a static image 242 for consumption by the static display device 202. The static image 242 may then be transmitted by the image service 210 to the static display device 202 as indicated by the image path 244.

In another embodiment, the image service 210 requests dynamic content under its own initiation and control according to the schedule that may be configured by the user 204. In this embodiment, the image service may store the static image 242 generated, update the static image according to the schedule, and provide the presently cached image when a request is received from the static display device 202. The static image 242 may be transmitted by the image service 210 to the static display device 202 as indicated by the image path 244. The image service 210 may identify static image 242 to present to the static display device 202 by a proxy URL received from and associated with an account for the static display device 202 that points to the static image 242 on the image service 210. The user 204 can access the frame service 208 through the user's computer 206 to configure a proxy URL on the static display device 202. The static display device 202 can access an image stored at the proxy URL location at the image service 210 on a regular schedule in order to update the image displayed by the static display device 202. A corresponding function of the image service 210 may be to regularly replace the image stored at a single proxy URL for a particular static display device 202 with a static image of updated dynamic content at scheduled intervals.

In an alternate implementation, the static display device 202 may be configured to request and accept an RSS feed from the image service 210 as indicated by RSS path 230. The static display device 202 may store a list or schedule of different proxy URLs pointing to different types of dynamic content for conversion to static images at the image service 210. The RSS feed may provide a regular update of new proxy URLs for the static display device 202 to access based upon either a configured schedule or a schedule provided in the RSS feed. The RSS feed may also contain URL pointers to images on photo sharing sites and URL pointers to images parsed out of web pages as previously described with respect to FIG. 1. The static display device 202 may send a proxy URL request indicated by the proxy URL path 232 to the image service 210 for delivery of a new static image 242 for display by the static display device 202. The static images 242 may be created in real time from dynamic content presentations accessed by the image service 210 in a real-time response to a request from the static display device 202. Alternately, the static images 242 may be retrieved in advance according to a scheduled and stored at the image service 210. In yet another embodiment, the static images 242 could be stored at some other location accessible over a communication network and identified by a URL provided to the static display device 202 by the image server 210.

Figure 3:
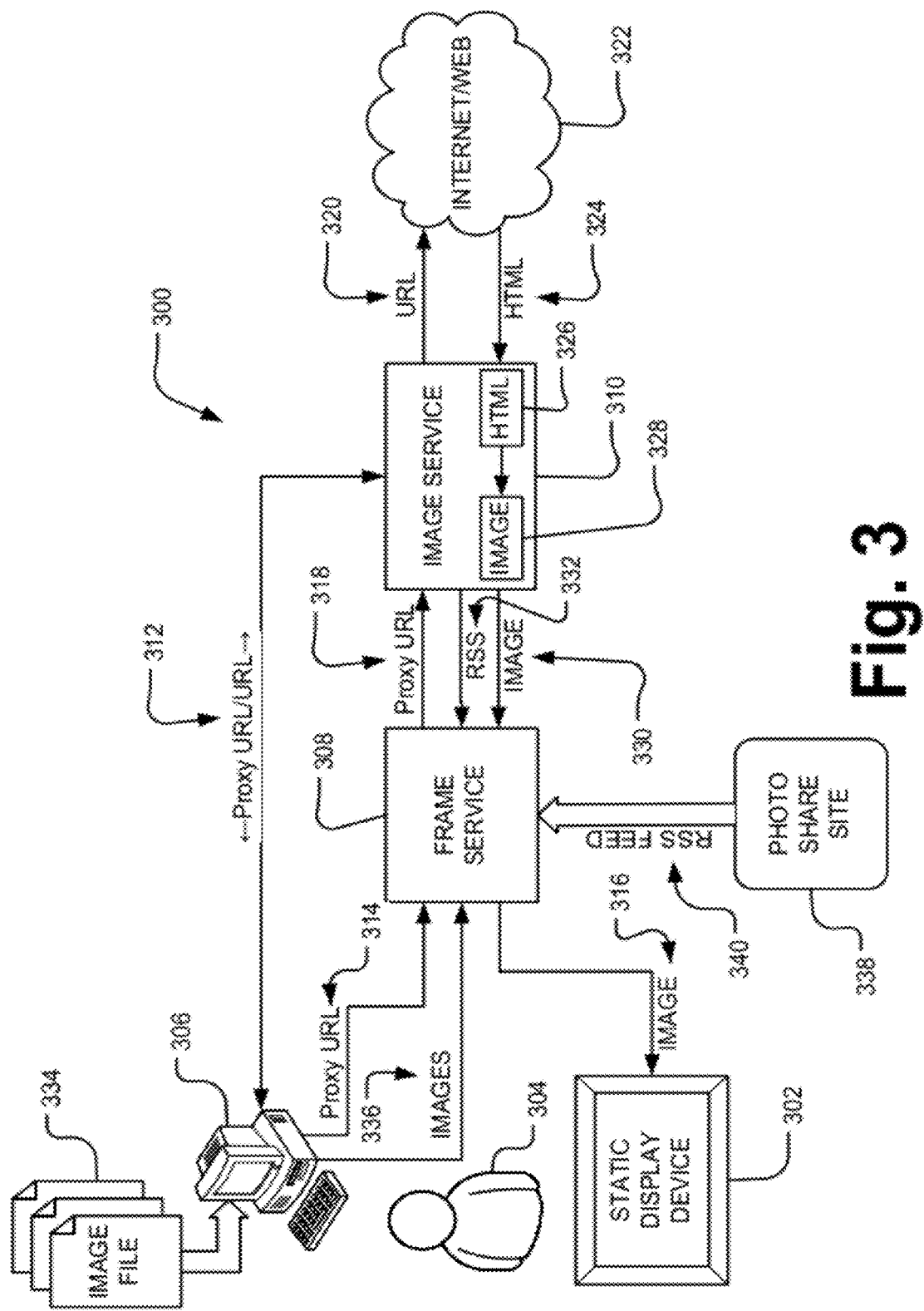
FIG. 3 is a schematic diagram of a further implementation of a dynamic content delivery system for a static display device.

A further exemplary implementation of a dynamic content delivery system 300 for a static display device 302 is depicted in FIG. 3. In this example, the static display device 302 is a dumb device in the form of a digital picture frame that may be used by a user 304 to display static images, for example, still digital photographs. For operability of this technology, the static display device 302 may be network enabled. The static display device 302 is thus connected to a communication network in order to receive updated images for display. Connection with communication network can be made in a variety of ways, for example, through a direct twisted-pair connection to a telephone jack to provide a gateway to the public switch telephone network; through an Ethernet connection to a local area network; or through a wireless transceiver connecting the static display device 302 to a local area network. In any of these cases, either direct connection with a telephone network or connection with a local area network, these initial networks may be further connected with a wide area network, for example, the Internet, in order to implement the dynamic content delivery system 300. Alternatively, a user could run an application on the computer 306 that communicates directly with the image service 310 to access the static image files and then copy the static images to a memory card for insertion in the static display device.

The user 304 may employ a computer 306, e.g., a personal computer (PC), a notebook computer, or a handheld device, in order to communicate with a frame service 308 to configure images for display on the static display device 302. The frame service 308 is typically a web-based application service operated by the manufacturer of the static display device 302. The frame service 308 may allow the user 304 to interface with the frame service 308 through a browser application on the user's computer 306. In normal operation, the user 304 may use the computer 306 to upload digital images 334, e.g., photographs, to the frame service 308 as indicated by image path 336 and configure settings within the frame service 308 to control delivery and display of the digital images on the static display device 302. The frame service 308 may also be configured to retrieve photos from a photo share site 338. In this embodiment, the frame service 308 may receive an RSS feed 340 from the photo share site 338 indicating the file names to download or URLs to access from the photo share site 338 on a scheduled basis. The frame service 308 can then send the images to the static display device 302 received from the photo share site 338. In an alternate embodiment, the frame service 308 may be an application running directly on the user's computer 306 that then communicates with the static display device 302 over a local network. In either case the operations of the frame service 308 will be substantially the same.

The system 300 depicted in FIG. 3 may be considered a "closed" system as all interaction with the static display device 302 is controlled by the frame service 308. In order to deliver dynamic content to the static display device 302, the system 300 further includes an image service 310. The function of the image service 310 is to translate dynamic content into static content that is consumable by the static display device 302. In order to enable dynamic content delivery, the user 304 may use the user's computer 306 to further configure the image service 310 to provide dynamic content to the frame service 308. Again the user's computer 306 may interface with the image service 310 over the Internet/Web using a browser application. The image service 310 may be a web-enabled application operated on a network server computer connected with the Internet/Web.

The image service 310 allows the user 304 to select dynamic content, for example, content from the Web, for transformation into a static image that can be displayed on the static display device 302. The user can identify desired dynamic content by creating a list or inventory of URLs for the image service 310 to access and convert. The user 304 can also direct the image service 310 to refresh the acquisition and transformation of the dynamic content on a regular basis. For example, the user 304 may direct the image service 310 to refresh its capture of a web page containing stock quote information every 30 minutes, while capturing a web page with ski conditions on a daily basis. In another implementation, the frame service 308 may direct the image service 310 to refresh the dynamic content captured as further discussed below. In practice, the user 304 may directly input URLs into a listing with the image service 310 as indicated by proxy URL/URL path 312. Alternatively, the user 304 may search or browse for desired websites and web content on the Internet through an interface within the image service 310 and then select a desired web page found within the context of the image service 310.

Once the user 304 has configured the desired dynamic content for delivery by the image service 310, the image service 310 may create a proxy URL that will direct a browser or file transfer application to an image file created within the image service 310 specific the user 304. The proxy URL may be a storage location at the image service 310 or a separate storage device managed and accessible by the image service 310 where the dynamic content, statically rendered, is stored. Alternatively, the proxy URL may be a pointer to a specific instruction set on the image server 310 that instructs the image server to retrieve specific dynamic content from a particular location and transform the dynamic content into a static image according to a set of configuration parameters as further described below. Thus, the dynamic content may be retrieved asynchronously according to a routine wherein the static image is rendered and stored until requested, synchronously when the static display device 102 requests the dynamic content, or a combination of both (e.g., if an asynchronous retrieval has not yet been performed, the dynamic content may be retrieved immediately).

In one implementation, the image service 310 may return the proxy URL to the user's computer 306 of the user 304 as indicated in proxy URL/URL path 312. The user 304 may then provide the proxy URL to the frame service 308 as indicated by proxy URL path 314. In normal operation in the closed system, the frame service 308 then uses the proxy URL to request a static image 328 from the image service 310 as indicated by proxy URL path 318.

In an alternate implementation, the image service 310 may provide the frame service 308 with a RSS feed as indicated by RSS path 332. The RSS file provided to the frame service 308 may be in the form of an XML file listing the proxy URL paths and providing a schedule instructing the frame service 308 when to update an image from a particular proxy URL with new dynamic content. The frame service 308 may then request updated dynamic content by communicating with the image service 310 at the proxy URL address.

In response to a request received from the frame service 308 or in accordance with a schedule determined by the user 304, the image service 310 will retrieve dynamic content from websites on the Internet 322 identified by one or more of the URLs listed by the user 304 in the user's account as indicated by URL path 320. The image service 310 retrieves dynamic content from the Internet, generally in HTML format as indicated by HTML path 324, but other formats may be accepted as well. Once received at the image service 310, the HTML content 326 is transformed into a static image file 328. The static image file 328 may be in the form of a bitmap file, e.g., a Joint Photographic Experts Group (JPEG) file, a graphic interchange format (GIF) file, a tagged image file format (TIFF) file, or any of a number of static image file formats that may be used by the static display device 302.

The frame service 308 requests the static image 328 from the image service 310 at the proxy URL location as indicated by the proxy URL path 318. The frame service 308 receives the image 328 from the image service 310 over the network as indicated by the image path 330 and then delivers the image as shown in image path 316 to the static display device 302. Depending on the set up of the static display device 302, the static image of the dynamic content may be stored in memory on the static display device 302 to automatically replace the image presented on the static display device 302 or for display in rotation with other static images on the static display device 302 according to a schedule.

Figure 4:
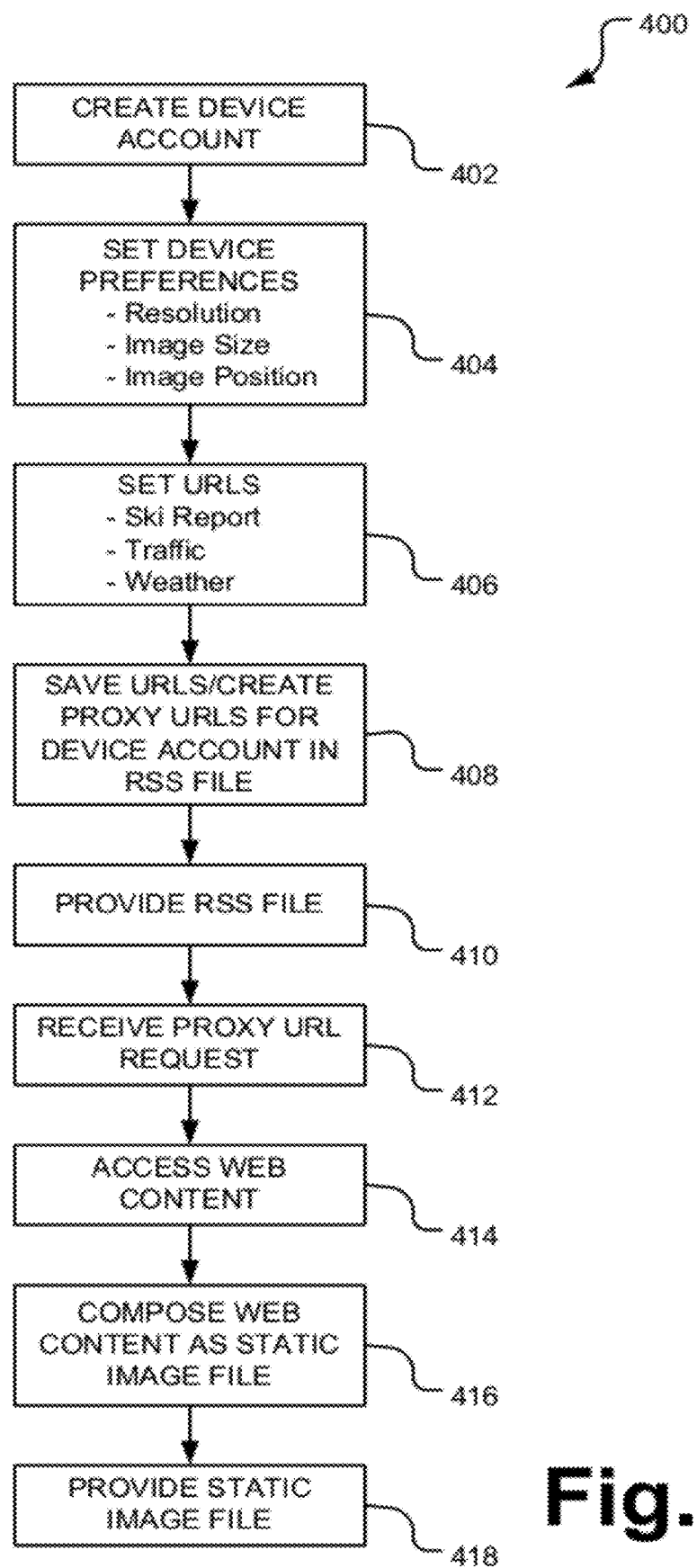
FIG. 4 is a flow diagram of an exemplary process for providing dynamic content delivery to a static display device.

A flow diagram of an exemplary process 400 for configuring, creating, and delivering static images of dynamic content by the image service is depicted in FIG. 4. The exemplary process 400 may initially include the creation of a device account as indicated in operation 402. In this operation, the user may use a personal computer or other computing device to access the image service and create an account specific to a static display device, e.g., a digital picture frame, to which the user would like to provide dynamic content. Any contact information for the user of the account may be entered as well as user identification and password information to protect future access to the account. Once the account is created, the image service may create a unique URL for the static display device to use in contacting the image service to access image files, a list of proxy URLs, or an RSS feed providing such information. The user would then use the personal computer to provide the unique URL to the static display device.

Once the general account is created, preferences particular to the individual static display device may be set in operation 404. These preferences or configuration parameters may include a desired image resolution (e.g., the screen resolution of the display of a target static display device), an image size (e.g., the physical height and width of display of the target static display device), and an image position (e.g., information about how an image that is less than a full display size is positioned on the display of the target static display device). For example, with respect to an image position parameter, the image service could use information indicating that the default position of an image on the display of the static display device is the top left corner and build a border around the static image that is smaller than the display size to ensure that the image in the final display is centered. Other configuration parameters to specify quality, format, and compression properties of the static images rendered from dynamic HTML content by the image service that are compatible with the static display device may also be specified.

Another parameter may be the intended distance from which an image on the static display device is expected to be viewed. For example, the physical size of the display of the static display device and the viewing distance may be considered together during the imaging process to ensure that text and other content are legible from the specified distance. In one implementation a user may be provided the ability to set particularized preferences for rendering a specific page of dynamic content. For example, horizontal and vertical offsets could be set for a specific web page in order to ensure that relevant content is captured in and irrelevant content is removed from the static image that is ultimately rendered.

In a further configuration step of the process 400, a user may set up a list or schedule of URLs indicating locations of dynamic content for the image service to retrieve and provide in a format consumable by the static display device. For example, a user could identify separate URLs for retrieving regular updates on ski conditions, traffic conditions, and weather forecasts from various information providers on the Internet in operation 406. The user may directly enter the URL information if the address is known or the user may navigate to desired web sites within an interface provided by the image service and select desired dynamic content presentations when a particular page is reached.

In addition to the preferences and configuration parameters previously set, a user may be able to set preferences specific to a particular web site of dynamic content selected using one or more interface tools. For example, the user may use an interface tool to set X-Y offset parameters to indicate one or more boundaries in the dynamic content presentation within or outside of to include or exclude in the static image. These parameters might be useful for stripping out sections such as headers, footers, side-bar navigation areas, and side-bar advertisements to limit the display on the static display device to only pertinent information. In another implementation, the image service might provide the user with a tool to select only a certain region of a web page for rendering on the static display device. This tool may take the form of a box that a user could draw and resize to include only the desired portion of the dynamic content desired for display in the static display device.

In a further implementation, the user may again use an interface tool to set parameters to select regions of dynamic content on a web page instead of the entire web page for static image transformation by the image service. However, instead of setting a X-Y offset or dragging a box across a portion of the page as previously described, the region selection could be "smart." If a certain feature of content is selected by the user, the image service may analyze the underlying div tags, table tags, and other tags in the underlying HTML coding. When creating future static images from the dynamic content presentation, the image service could limit the image to divisions or tables identified by the smart region selection regardless of whether the size of the divisions or tables changes due to the dynamic content placed therein.

In yet another implementation, the user can set preferences to use only certain elements extracted from a desired web page. For example, a user could use an interface tool to select a parameter instructing the image service to extract the largest embedded image in a web page or embedded images larger than a certain size on the web page. In this way, as a picture on a web page dynamically changes (e.g., the website provides a "picture of the day" each day), the image service will always provide the revised picture to the static display device.

Once the user determines the location of the dynamic content to send to the static display device, the image service may create proxy URLs for the particular static display device account. Additionally, if static images embedded in web pages are desired for extraction and need no transformation, direct URLs to each desired picture location may be provided in the RSS feed. In an implementation in which the static display device is RSS compatible, the image service saves the proxy URLs and/or actual URLs in an RSS file as indicated in operation 408. The proxy URLs are created so that the static display device directs a request for an updated image to the image service rather than directly to the target web page with the dynamic content on the Internet. The proxy URL may operate as a pointer to a database entry associated with the device account on the image service which holds the actual URL of the desired dynamic content for the image service to retrieve. Once created, the RSS file may be provided to the static display device as indicated in operation 410. Once a static display device receives an RSS file, it may periodically send a proxy URL request to the image service according to either a schedule in the RSS file or a schedule otherwise configured by the user on the static display device as indicated in operation 412. Alternately, the static image device may use an actual URL received in the RSS feed to retrieve an embedded image directly from a web page.

Once the image service receives the proxy URL request from the static display device, the image service accesses the dynamic content from the Internet at the actual URL associated with the proxy URL as indicated in operation 414 or from a cache if already retrieved asynchronously according to a schedule. In one implementation, rendering parameters may be forwarded to the web site serving the dynamic content to provide custom markup instructions for returning an HTML presentation that is optimized for the static display device. These instructions may be similar in form to how content is optimized for display on mobile devices. In a further implementation, new hypertext transfer protocol (HTTP) header strings that convey this information may be added to the request for the dynamic content. For example, HTTP headers for "Client-Resolution" and "Client-Size" may be provided. A sample HTTP request would then contain lines: Client-Resolution: 800×600; and Client-Size: 11 in×8 in. The web site could then render a customized version of the desired dynamic content in HTML that meets these parameters.

Once the image service receives the dynamic content data from the URL location it then composes the HTML data. The image service applies any user specified parameters to format the desired dynamic content for presentation and transforms the dynamic content presentation into a static image file or extracts an embedded image from the dynamic content presentation as indicated in operation 416. The image service may also be configured to automatically modify the dynamic content presentation before rendering the static image. For example, the image service may resize the static image in the event that the dynamic content presentation does not render in a specified size. The resizing operation may further be controlled by user parameters, for example, by providing preferences for how to stretch, shrink, or crop the static image. Other exemplary modifications may include removing underlining of hyperlinks and hiding buttons, as these elements cannot be actuated on a typical static display device. However, protocols can be implemented to provide a limited set of action capabilities corresponding to physical buttons on the display device.

In an additional implementation, a framework may be implemented to map HTML intended for standard browsers into HTML that is optimized for the static display device. One exemplary framework may include defining a cascading style sheet (CSS) file that is applied to the retrieved web page of dynamic content. The CSS file is applied by the image service before rendering the static image to selectively hide or modify the HTML elements of the page. This process may be beneficial to users or web site owners that have content on a remote service, but do not necessarily own or have access to the service to optimize the page layout. Such CSS file transformations can be submitted to the image service for application to certain configured URL or HTML patterns. These CSS file transformations may be published to enable sharing among users.

The image service then transmits the static image file to the static display device for display as indicated in operation 418. The static image file may be any standard bitmap image format, for example, JPEG, GIF, TIFF, etc., as indicated by the user as the preferred format for the static display device.

Figure 5:
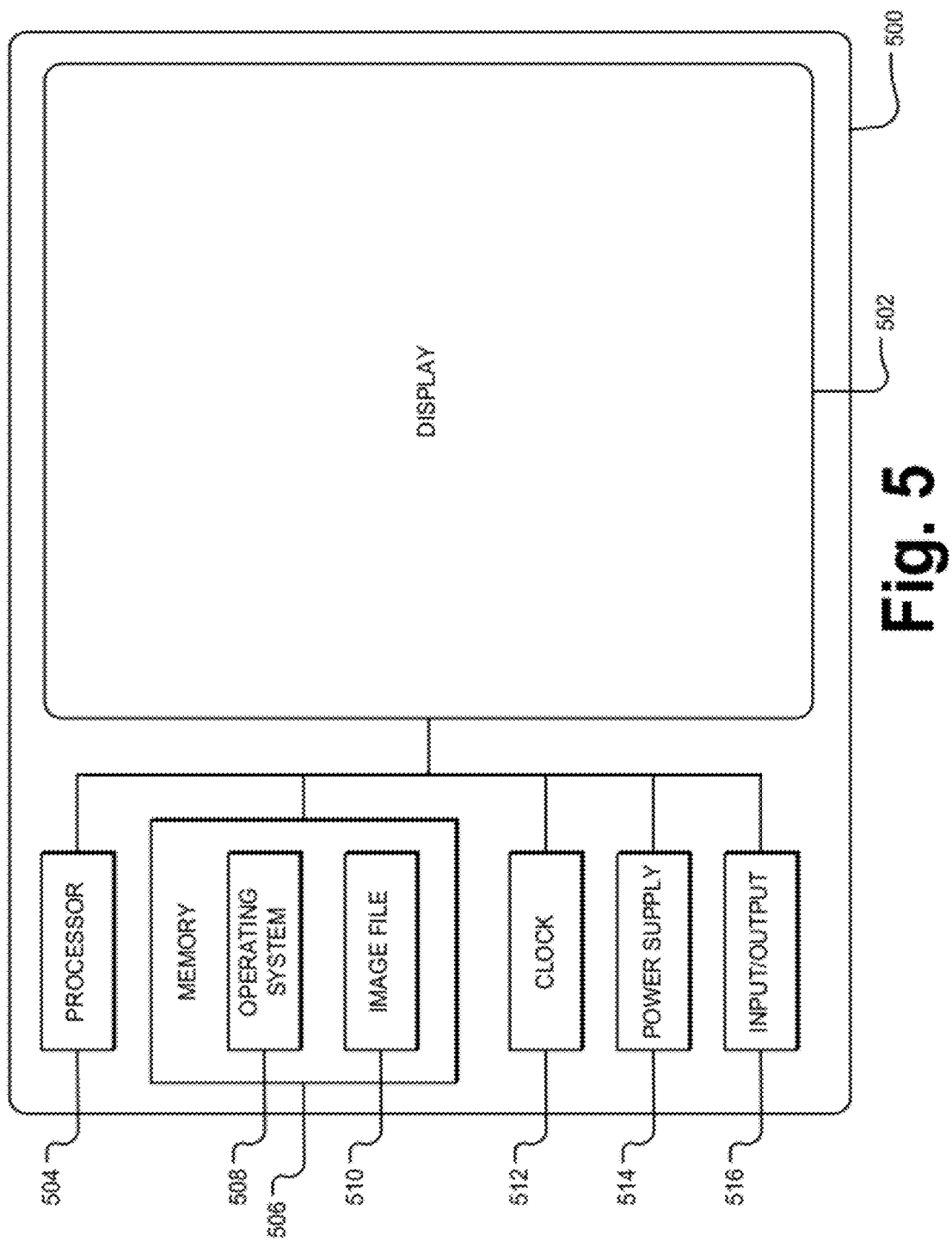
FIG. 5 is a schematic diagram of functional components of an exemplary implementation of a static display device.

A schematic diagram of an exemplary static display device 500 is presented in FIG. 5. As shown, the static display device 500 is primarily composed of a display 502, e.g., an LCD. The display 502 may be connected by a system bus to a processor 504 and a memory 506. The processor 504 may have limited capabilities to reduce the cost of the static display device. The memory 506 may store a limited operating system to provide the retrieval and display of images from a network source. The memory 506 may also store one or more image files 510 for presentation on the display 502. The memory 506 may further store RSS files indicating locations and schedules for retrieval of new image files of dynamic content. The static display device 500 may further include a clock 512 in order to implement the static image retrieval in accordance with the schedule provided in the RSS file. The clock 512 may be a separate component or it may be included as part of the architecture of the processor 504. The static display device 500 may further include a power supply 514 which may be in the form of batteries or an ac/dc converter for plugging into a wall outlet. Additionally, the static display device 500 may include an input/output 516 for receipt of image files and RSS files from and for transmission of proxy URLs to the image service. The input/output 516 may further allow configuration of the static display device 500 by the frame service. The input/output 516 may be a wired or wireless connection point.

Figure 6:
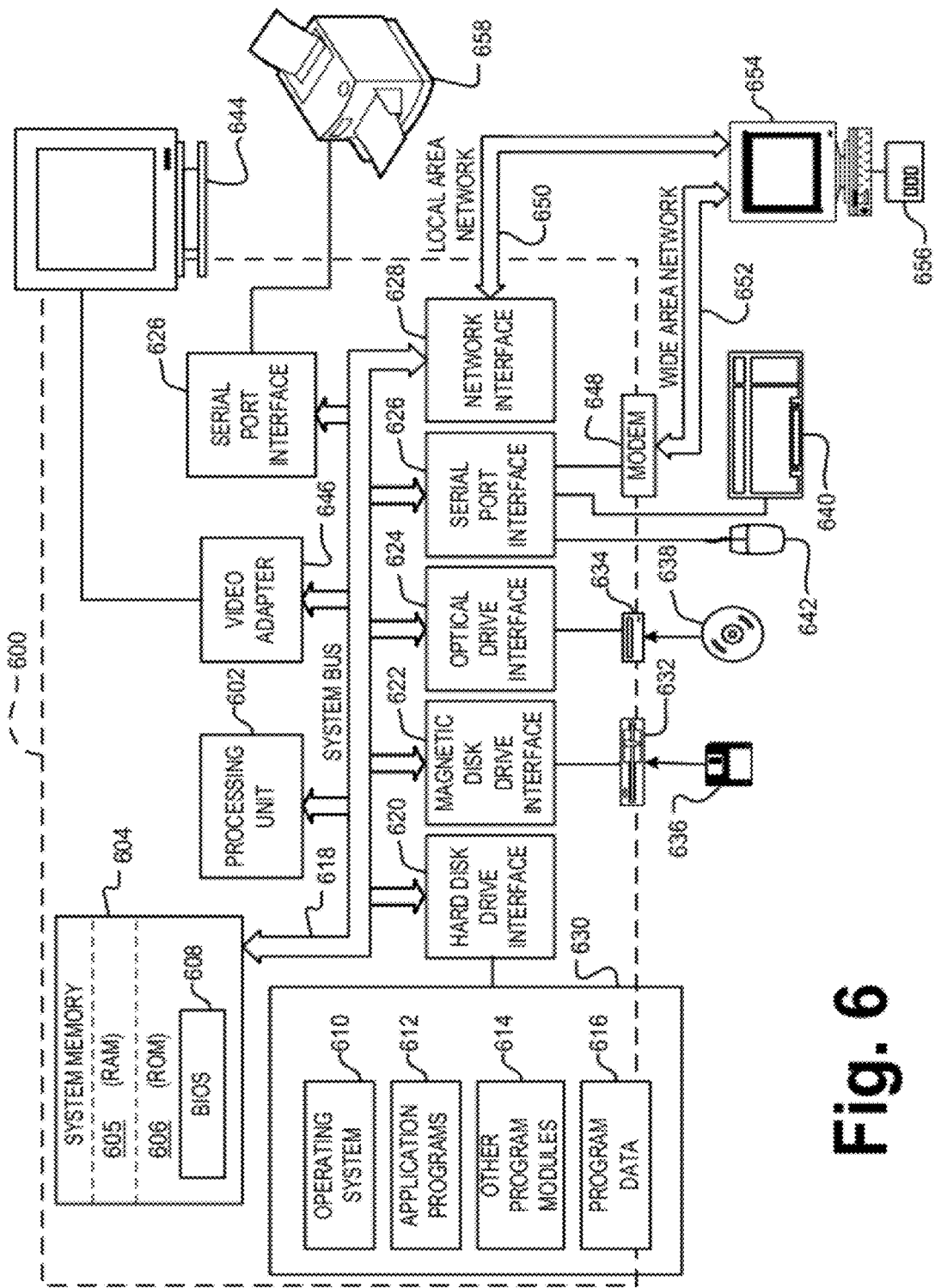
FIG. 6 is a schematic diagram of a general purpose computer system which may be used to implement the image service described herein.

An exemplary computer system 600 for implementing the image service processes above is depicted in FIG. 6. The computer system 600 may be a server computer with internal processing and memory components as well as interface components for connection with external input, output, storage, network, and other types of peripheral devices. Internal components of the computer system in FIG. 6 are shown within the dashed line and external components are shown outside of the dashed line. Components that may be internal or external are shown straddling the dashed line. Alternatively to a server, the computer system 600 may be in the form of any of a personal computer (PC), a notebook or portable computer, a tablet PC, a handheld media player (e.g., an MP3 player), a smart phone device, a video gaming device, a set top box, a workstation, a mainframe computer, a distributed computer, an Internet appliance, or other computer devices, or combinations thereof.

The exemplary hardware and operating environment of FIG. 6 for implementing the invention includes a general purpose computing device in the form of a computer 600, including a processing unit 602, a system memory 604, and a system bus 618 that operatively couples various system components, including the system memory 604, to the processing unit 602. There may be one or more processing units 602, such that the processor of computer 600 comprises a single central processing unit (CPU), or a plurality of processing units, commonly referred to as a parallel processing environment. The computer 600 may be a conventional computer, a distributed computer, or any other type of computer; the invention is not so limited. The system bus 618 may be any of several types of bus structures including a memory bus or memory controller, a peripheral bus, a switched fabric, point-to-point connections, and a local bus using any of a variety of bus architectures.

The system memory 604 may also be referred to as simply the memory, and includes read only memory (ROM) 606 and dynamic or static random access memory (RAM) 605. A basic input/output system (BIOS) 608, containing the basic routines that help to transfer information between elements within the computer 600, such as during start-up, is stored in ROM 606. The system memory may be in the form of volatile and/or nonvolatile solid state memory modules, e.g., single inline memory modules (SIMMs) or dual inline memory modules (DIMMs).

The computer 600 may further include a hard disk drive 630 for reading from and writing to a hard disk therein, a magnetic disk drive 632 for reading from or writing to a removable magnetic disk 636, and an optical disk drive 634 for reading from or writing to a removable optical disk 638 such as a CD ROM, digital video disks (DVD), or other optical media. A number of software program modules may be stored on the hard disk 630 including an operating system 610, one or more application programs 612, other program modules 614, and program data files 616. In an exemplary implementation, the functionality of the image services may be provided as an application program 612 and data 616 on a server computer. Alternatively, the computer 600 may be equipped with a flash memory drive or other solid state memory instead of the hard drive 630 for storage of the operating system 610, application programs 612, program modules 614, and program data files 616.

The hard disk drive 630, magnetic disk drive 632, and optical disk drive 634 are connected to the system bus 618 by a hard disk drive interface 620, a magnetic disk drive interface 622, and an optical disk drive interface 624, respectively. The drives and their associated computer-readable media provide nonvolatile storage of computer-readable instructions, data structures, program modules, and other data for the computer 600. It should be appreciated by those skilled in the art that any type of computer-readable media that can store data that is accessible by a computer, for example, magnetic cassettes, flash memory cards, DVDs, SIMMs, and DIMMs, may be used in the exemplary operating environment.

A user may enter commands and information into the computer system 600 through input devices such as a keyboard 640 and pointing device 642, for example, a mouse. Other input devices (not shown) may include, for example, a microphone, a joystick, a game pad, a tablet, a touch screen device, a scanner, a facsimile machine, and a video camera. These and other input devices are often connected to the processing unit 602 through a serial port interface 626 that is coupled to the system bus 618, but may be connected by other interfaces, such as a parallel port, game port, or a universal serial bus (USB).

A monitor 644 or other type of display device is also connected to the system bus 618 via an interface, such as a video adapter 646. In addition to the monitor 644, the computer 600 may include other peripheral output devices, such as a printer 658 and loudspeakers (not shown). These and other output devices are often connected to the processing unit 602 through the serial port interface 626 that is coupled to the system bus 618, but may be connected by other interfaces, such as a parallel port, game port, or a universal serial bus (USB).

The computer 600 may operate in a networked environment using logical connections to one or more remote computers, such as remote computer 654. These logical connections may be achieved by a communication device coupled to or integral with the computer 600. The remote computer 654 may be another server, a personal computer, a router, a dumb terminal, a peer device, or other common network node, and typically includes many or all of the elements described above relative to the computer 600, although only a memory storage device 656 has been illustrated in FIG. 6. The logical connections depicted in FIG. 6 include a local-area network (LAN) 650 and a wide-area network (WAN) 652. Such networking environments are commonplace in office networks, enterprise-wide computer networks, intranets and the Internet, which are all types of networks.

When used in a LAN 650 environment, the computer 600 may be connected to the local network 650 through a network interface or adapter 628, e.g., Ethernet or other communications interfaces. When used in a WAN 652 environment, the computer 600 typically includes a modem 648, a network adapter, or any other type of communications device for establishing communications over the wide area network 652. The modem 648, which may be internal or external, is connected to the system bus 618 via the serial port interface 626. In a networked environment, program modules depicted relative to the computer system 600, or portions thereof, may be stored in a remote memory storage device, e.g., a file server. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products. In one implementation, a computer program product is provided as a computer-readable medium storing an encoded computer program executable by a computer system. Another implementation of a computer program product may be provided in a computer data signal embodied in a carrier wave by a computing system and encoding the computer program. Other implementations are also described and recited herein.

The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method in a computer system for rendering a static image from a dynamic content presentation in a web page defined in HTML on a static display device comprising:
    receiving an instruction to provide the static image embedded in the dynamic content presentation, wherein the instruction includes a location identifier of the dynamic content presentation;
    retrieving the dynamic content presentation over a network from a location indicated by the location identifier in the instruction;
    parsing the dynamic content presentation to determine a direct location identifier for the embedded static image;
    transmitting a configuration parameter of the static display device to the location of the dynamic content presentation for configuration of the embedded static image; and
    transmitting the direct location identifier to the static display device for direct retrieval of the embedded image from the web page,
    wherein the receiving operation further comprises:
        providing an interface for navigation to the location to determine the location identifier; and
        providing an interface tool to identify the static image within the dynamic content presentation.

2. The method of claim 1, wherein the transmitting operation further comprises transmitting the direct location identifier in conjunction with a plurality of other location identifiers.

3. The method of claim 1 further comprising transmitting a schedule for requesting a number of static images respectively associated with each of the plurality of other location identifiers.

4. A computer-readable medium not consisting of a signal storing computer-executable instructions for performing a computer process to render a static image from a dynamic content presentation in a web page defined in HTML on a static display device, wherein the instructions comprise operations to:

receive an instruction to provide the static image embedded in the dynamic content presentation, wherein the instruction includes a location identifier of the dynamic content presentation;

retrieve the dynamic content presentation over a network from a location indicated by the location identifier in the instruction;

parse the dynamic content presentation to determine a direct location identifier for the embedded static image;

transmit a configuration parameter of the static display device to the location of the dynamic content presentation for configuration of the embedded static image; and transmit the direct location identifier to the static display device for direct retrieval of the embedded image from the web page, wherein the receive operation further comprises operations to:

provide an interface for navigation to the location to determine the location identifier; and provide an interface tool to identify the static image within the dynamic content presentation.

5. The computer-readable medium of claim 4, wherein:

the instructions further comprise operations to receive at a proxy location a request for the dynamic content presentation from the static display device pursuant to a proxy location identifier;

the parse operation further comprises instructions to extract the embedded static image; and the transmit operation further comprises instructions to transmit the extracted static image to the static display device.

6. The computer-readable medium of claim 4, wherein the transmitting operation further comprises an operation to transmit the direct location identifier in conjunction with a plurality of other location identifiers.

7. The computer-readable medium of claim 4, wherein the instructions further comprise operations to transmit a schedule for requesting a number of static images respectively associated with each of the plurality of other location identifiers.

* * * * *